(12) United States Patent
Walden

(10) Patent No.: US 10,883,493 B1
(45) Date of Patent: Jan. 5, 2021

(54) POOL PUMP AIR RELEASE

(71) Applicant: Jayson Walden, Clarksville, TN (US)

(72) Inventor: Jayson Walden, Clarksville, TN (US)

(*) Notice: Subject to any disclaimer, the term of this patent is extended or adjusted under 35 U.S.C. 154(b) by 0 days.

(21) Appl. No.: 16/261,128

(22) Filed: Jan. 29, 2019

Related U.S. Application Data

(60) Provisional application No. 62/623,060, filed on Jan. 29, 2018.

(51) Int. Cl.
| *F16K 1/34* | (2006.01) |
| *F04B 53/10* | (2006.01) |
| *F16K 31/44* | (2006.01) |
| *E04H 4/12* | (2006.01) |
| *B01D 35/147* | (2006.01) |

(52) U.S. Cl.
CPC ........ *F04B 53/1032* (2013.01); *B01D 35/147* (2013.01); *E04H 4/12* (2013.01); *F16K 1/34* (2013.01); *F16K 31/44* (2013.01); *B01D 2201/167* (2013.01); *E04H 4/1245* (2013.01); *F04B 53/103* (2013.01)

(58) Field of Classification Search
CPC ....... E04H 4/12; E04H 4/1209; E04H 4/1245; F16K 1/34; F16K 31/44; F16K 15/20; F16K 15/203; F16K 15/205; F16K 15/207; B01D 35/147; B01D 35/1475; B01D 35/157; B01D 35/1573; B01D 2201/16; B01D 2201/167; F04B 49/03; F04B 49/22; F04B 53/06; F04B 53/20; F04B 53/102; F04B 53/103; F04B 53/1032; F04B 53/127; F04B 53/128; Y10T 137/3084; Y10T 137/7922; Y10T 137/7929; Y10T 137/7932; Y10T 137/6086; Y10T 137/6184; Y10T 137/6188; Y10T 137/6191; Y10T 137/6195; Y10T 137/0486; Y10T 137/0491; Y10T 137/3584–3786; Y10T 137/85978–86179
USPC .......... 137/197, 535, 537, 540, 542, 315.33, 137/329.1–329.4, 15.17, 15.18; 220/202; 210/120, 436, 445, 455, 167.1, 167.12, 210/167.19; 251/321, 329, 337, 354; 4/490, 509
See application file for complete search history.

(56) References Cited

U.S. PATENT DOCUMENTS

| 1,567,184 | A | * | 12/1925 | Conrader | ................ F04B 49/03 |
| | | | | | 417/29 |
| 2,281,604 | A | * | 5/1942 | Smith | ..................... A47J 47/00 |
| | | | | | 222/192 |
| 2,991,885 | A | * | 7/1961 | Gutkowski | .......... B01D 35/153 |
| | | | | | 210/133 |

(Continued)

FOREIGN PATENT DOCUMENTS

CN          203476690 U          3/2014

OTHER PUBLICATIONS

Air Release Valve, Controllable in Air Releasing Speed, for Pool Filtration Pump. Patent [online]. Google Patents, [retrieved on Jul. 21, 2017]. Retrieved form the Internet <URL:https://patents.google.com/patent/CN203476690U/en?oq=air+release+for+a+pool+valve>.

*Primary Examiner* — Craig J Price
(74) *Attorney, Agent, or Firm* — Cramer Patent & Design, PLLC; Aaron R. Cramer

(57) ABSTRACT

An air release and pump primer attachable to a swimming pool pump is configured to permit the manual release of air trapped inside a pool pump while permitting the pump to be manually primed with fluid.

14 Claims, 4 Drawing Sheets

(56) References Cited

U.S. PATENT DOCUMENTS

| | | | |
|---|---|---|---|
| 3,041,975 A * | 7/1962 | Johnston | F01B 17/02 |
| | | | 417/401 |
| 4,197,097 A | 4/1980 | Magorien et al. | |
| 4,218,967 A * | 8/1980 | Batchelor | B65D 39/12 |
| | | | 206/524.8 |
| 4,524,794 A | 6/1985 | Haines | |
| 5,154,821 A | 10/1992 | Reid | |
| 5,308,386 A | 5/1994 | Wilkes | |
| 5,682,624 A | 11/1997 | Ciochetti | |
| 5,836,345 A | 11/1998 | Ericson | |
| 5,853,071 A * | 12/1998 | Robinson | B60T 11/30 |
| | | | 188/352 |
| 6,070,855 A * | 6/2000 | Chuang | F04B 33/005 |
| | | | 251/322 |
| 6,591,863 B2 | 7/2003 | Ruschell et al. | |
| 6,779,205 B2 | 8/2004 | Mulvey et al. | |
| 6,957,742 B1 * | 10/2005 | Pillart | B01D 36/001 |
| | | | 137/315.04 |
| 6,981,511 B2 * | 1/2006 | Knowles | B08B 9/0321 |
| | | | 137/1 |
| 7,077,162 B2 * | 7/2006 | Burdick | F16K 1/38 |
| | | | 137/881 |
| 7,784,117 B2 | 8/2010 | Hamza | |
| 8,348,228 B2 * | 1/2013 | Pili | F16K 15/18 |
| | | | 251/122 |
| 9,726,184 B2 | 8/2017 | Stiles et al. | |
| 2011/0180163 A1 | 7/2011 | Jakubowski | |
| 2014/0027361 A1 * | 1/2014 | Pennington | B01D 35/1475 |
| | | | 210/120 |
| 2015/0040996 A1 * | 2/2015 | Hanlon | E04H 4/1245 |
| | | | 137/197 |

* cited by examiner

POOL PUMP AIR RELEASE

RELATED APPLICATIONS

The present invention is a continuation of and claims the benefit of U.S. Provisional Application No. 62/623,060, filed Jan. 29, 2018, the entire disclosures of which are incorporated herein by reference.

FIELD OF THE INVENTION

The presently disclosed subject matter is directed to a pool pump air release.

BACKGROUND OF THE INVENTION

For children and adults, very few outdoor activities rival that of spending a hot summer day playing in a pool. Whether a large in-ground, Olympic size pool, or a small backyard pool, all pools utilize a filtration system and pump to keep the water clean and free of physical dirt and debris. During the operation and use of these filtration systems, it is a common occurrence for air to become trapped inside the filter and pump especially after cleaning cycles, emptying and refilling, or other periods of non-operation. As the air rises to the top, the filter media and pump impellor must operate partially in air, thus driving their efficiency way down.

Filter manufacturers typically place a bleed valve at the top of the filter to allow air to escape, but such a device is not usually provided on a pump. This causes the pump to work harder, utilize more energy, and not allow the filter to clean the water as well. Accordingly, there exists a need for a means by which pool pumps can be allowed to eliminate trapped air in an effort to eliminate these problems. The development of the pool pump air release fulfills this need.

SUMMARY OF THE INVENTION

The principles of the present invention provide for a manual air relief valve comprises a pool pump including a pump housing attached to a motor, a strainer assembly which has a removable lid upon which the manual air relief valve is mounted, a fixed body which is fastened in place on an underside of the removable lid by a lower gasket, a lower washer, and a lower nut against a threaded outer surface of the fixed body, in conjunction therewith, an upper gasket, an upper washer, and an upper nut seal the manual air relief valve on the outer surface of the removable lid and an actuation button connected to a center shaft which runs through a hollow opening through the fixed body. The lower end of the center shaft is provided with a valve disc complete with a valve gasket. The valve disc and the valve gasket operate against a valve seat provided as part of the fixed body.

The manual air relief valve for pool pumps may be mounted in an upper portion of the pump housing directly without the strainer assembly. The manual air relief valve may also be installed by drilling a suitable size hole in the removable lid, thus allowing installation by a final user in a do-it-yourself process. The actuation button and the center shaft may operate against a circular opening. The actuation button is in an activated position and held in a first open state by downward pressure, a first air/water travel path is provided to allow unwanted air to escape from the pump housing.

The actuation button may be in an activated position and held in a second open state by downward pressure, a second air/water travel path is provided to allow unwanted air to escape from the strainer assembly. The downward pressure may be provided by a thumb or a finger. The manual air relief valve may be used on other types of pool equipment not currently equipped with an air purge device that benefits from adding the air purge device.

The air purge device may be selected from the group consisting of a sand filter, a cartridge filter, a cleanout, a water treatment system, or an inverting piping run. The manual air relief valve may comprise standard equipment provided by a first manufacturer, or optional equipment provided by a second manufacturer or may be installed by a final purchaser as an after-market add-on kit. The manual air relief valve in a long-term open state includes a rising water level that is displacing unwanted air along the air/water travel path. The long-term open state may require continued downward pressure upon the actuation button and unwanted air exits immediately below the actuation button as the rising water level continues to rise upward. When water begins to exit from below the actuation button, the downward pressure is removed. Also, when the manual air relief valve is in a closed state here is no longer any unwanted air and water occupies all space on an underside of the removable lid. When the downward pressure removed, the circular opening pushes the actuation button and subsequently the center shaft upward. The valve disc and the valve gasket are sealed against the valve seat and preventing any further exiting of water. The manual air relief valve may be in a closed state is a normal operating position.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
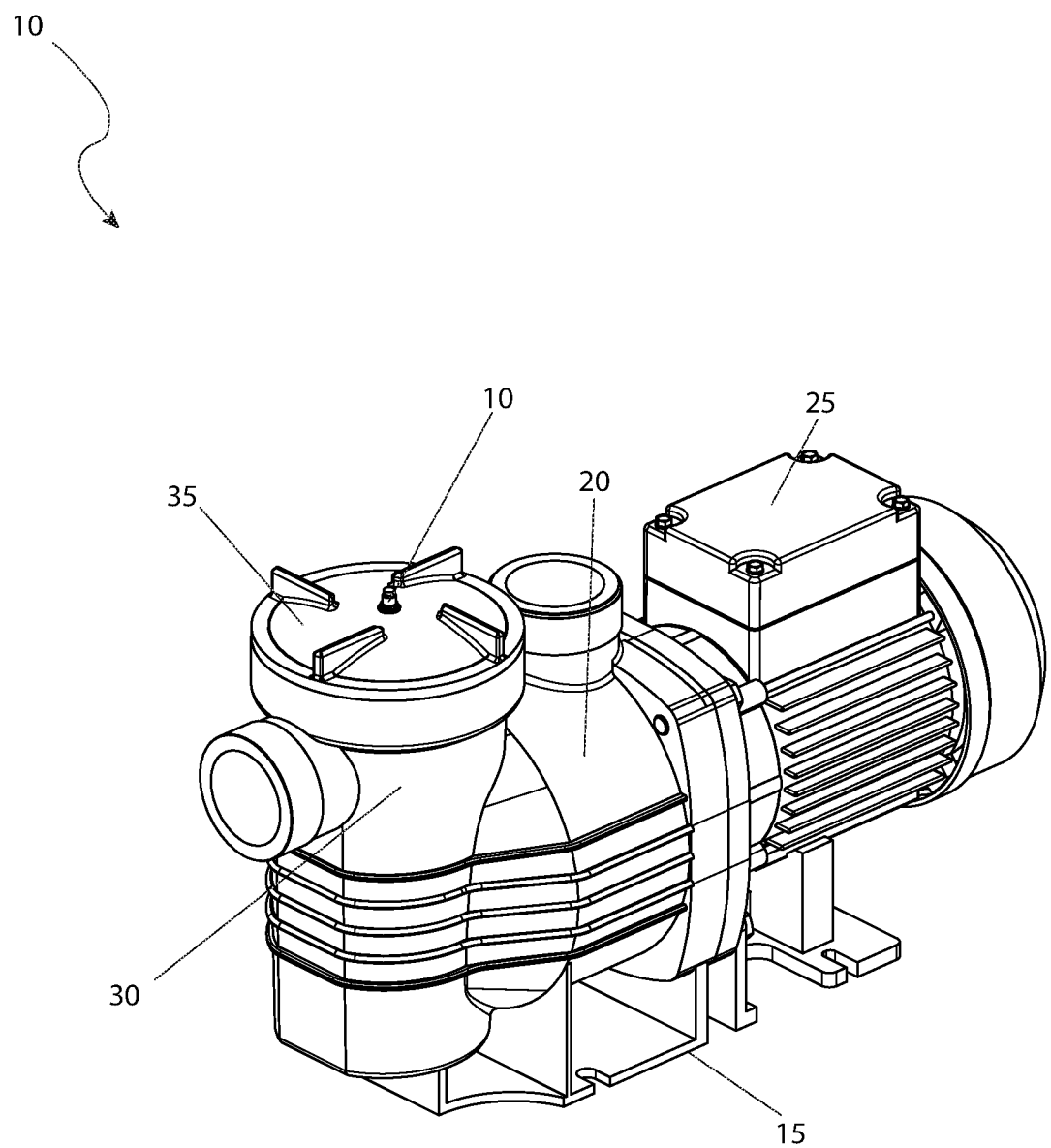
FIG. 1 is a perspective view of the manual air relief valve 10 for a pool pump 15, shown in an installed state on a pool pump 15, according to the preferred embodiment of the present invention.

DESCRIPTIVE KEY 10 manual air relief valve
15 pool pump
20 pump housing
25 motor
30 strainer assembly
35 removable lid
40 fixed body
45 lower gasket
50 lower washer 55 lower nut
60 threaded outer surface
65 upper gasket
70 upper washer
75 upper nut
80 actuation button
85 center shaft
90 hollow opening
95 valve disc
100 valve gasket
105 valve seat
110 circular opening
115 downward pressure
120 air/water travel path
125 rising water level
130 unwanted air
135 water

1. Description of the Invention

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

2. Detailed Description of the Figures

Referring now to FIG. 1, a perspective view of the manual air relief valve 10, shown in an installed state on a pool pump 15, according to the preferred embodiment of the present invention is disclosed. The manual air relief valve (herein also described as the "device") 10, is mounted on a pool pump 15 as shown. The pool pump 15 includes a pump housing 20 attached to a motor 25. A strainer assembly 30 is provided with a removable lid 35 upon which the device 10 is mounted. It should be noted that the pool pump 15 is typical in nature, and a wide variation in the type, style and appearance should be expected. However, the teachings of the manual air relief valve for pool pumps 10 remain the same and will be applicable in all cases. For example, a strainer assembly 30 may not be provided, in which case the manual air relief valve for pool pumps 10 may be mounted in the upper portion of the pump housing 20 directly. As such, the appearance, description, location, and operation of the manual air relief valve for pool pumps 10 is not intended to be a limiting factor of the present invention. Additionally, the device 10 may be used on other types of pool equipment not currently equipped with an air purge device or equipment that would benefit from the addition of an air purge device. Such equipment would include, but not be limited to: sand filters, cartridge filters, cleanouts, water treatment systems, inverting piping runs and similar items/locations. It is envisioned that the device 10 could be provided as standard or optional equipment as provided by the manufacturer or could be installed by the final purchaser as an after-market add-on kit. Further description of the device 10 will be provided herein below.

Figure 2:
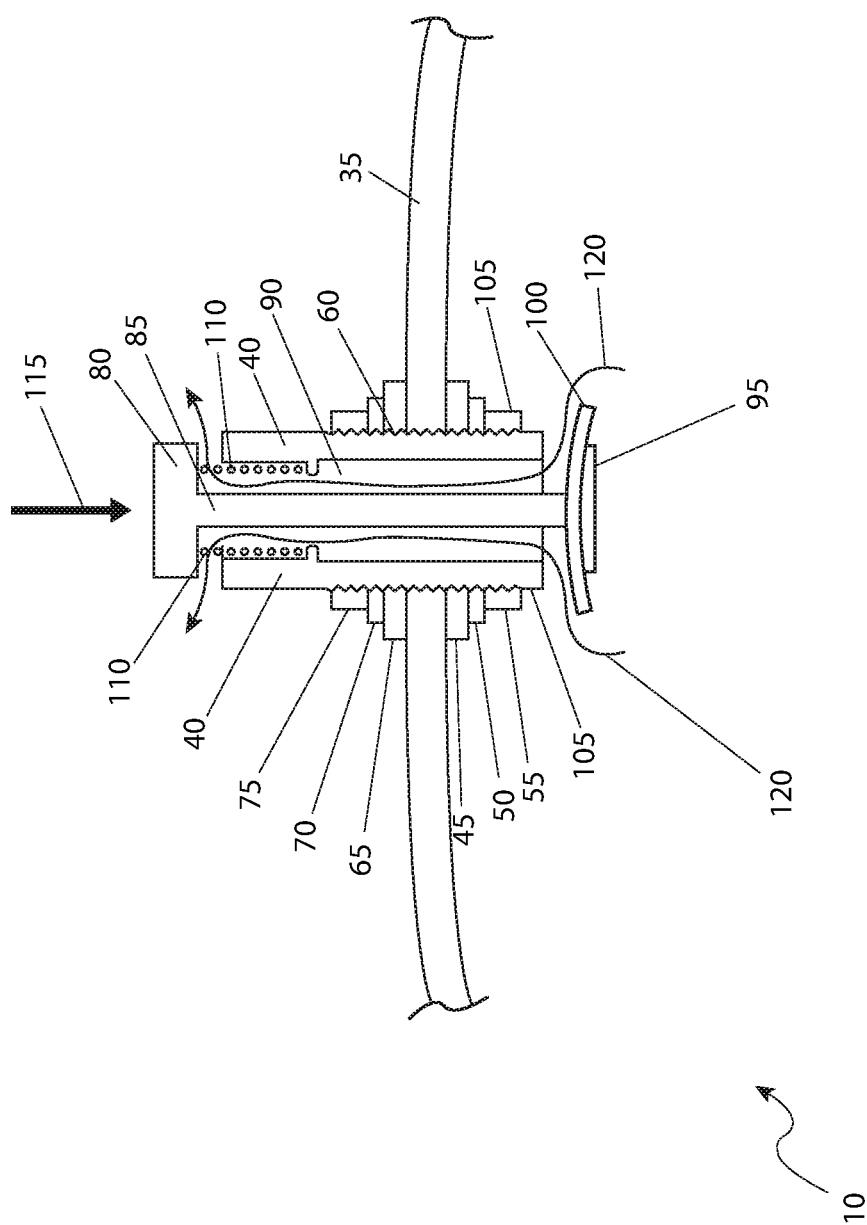
FIG. 2 is a sectional view of the manual air relief valve 10, as seen along a line I-I, as shown in FIG. 1, in an initially open state, according to the preferred embodiment of the present invention.

Referring next to FIG. 2, a sectional view of the device 10, as seen along a line I-I, as shown in FIG. 1, in an initially open state, according to the preferred embodiment of the present invention is depicted. The device 10 is provided with a fixed body 40, envisioned to manufactured from machined stainless steel, injection molded plastic, or other suitable material for the environment and pressures expected as well as pricing, life cycle and usage requirements. It is fastened in place on the underside of the removable lid 35 by a lower gasket 45, a lower washer 50, and a lower nut 55 against a threaded outer surface 60 of the fixed body 40. Likewise, and in conjunction therewith, an upper gasket 65, an upper washer 70, and an upper nut 75 seal the device 10 on the outer surface of the removable lid 35. This feature allows the device 10 to be installed by simply drilling a suitable size hole in the removable lid 35 and installing with only a wrench, thus allowing installation by the final user in a do-it-yourself process. An actuation button 80 is connected to a center shaft 85 which runs through a hollow opening 90 through the fixed body 40. The lower end of the center shaft 85 is provided with a valve disc 95 complete with a valve gasket 100. The valve disc 95 and the valve gasket 100 operate against a valve seat 105 provided as part of the fixed body 40. The actuation button 80 and the center shaft 85 operate against a circular opening 110 (here shown in cross section). As such, when in an activated position and held in an open state by downward pressure 115, such as provided by a thumb or finger, an air/water travel path 120 is provided to allow unwanted air to escape from the pump housing 20 (as shown in FIG. 1) or the strainer assembly 30 (as shown in FIG. 1).

Figure 3:
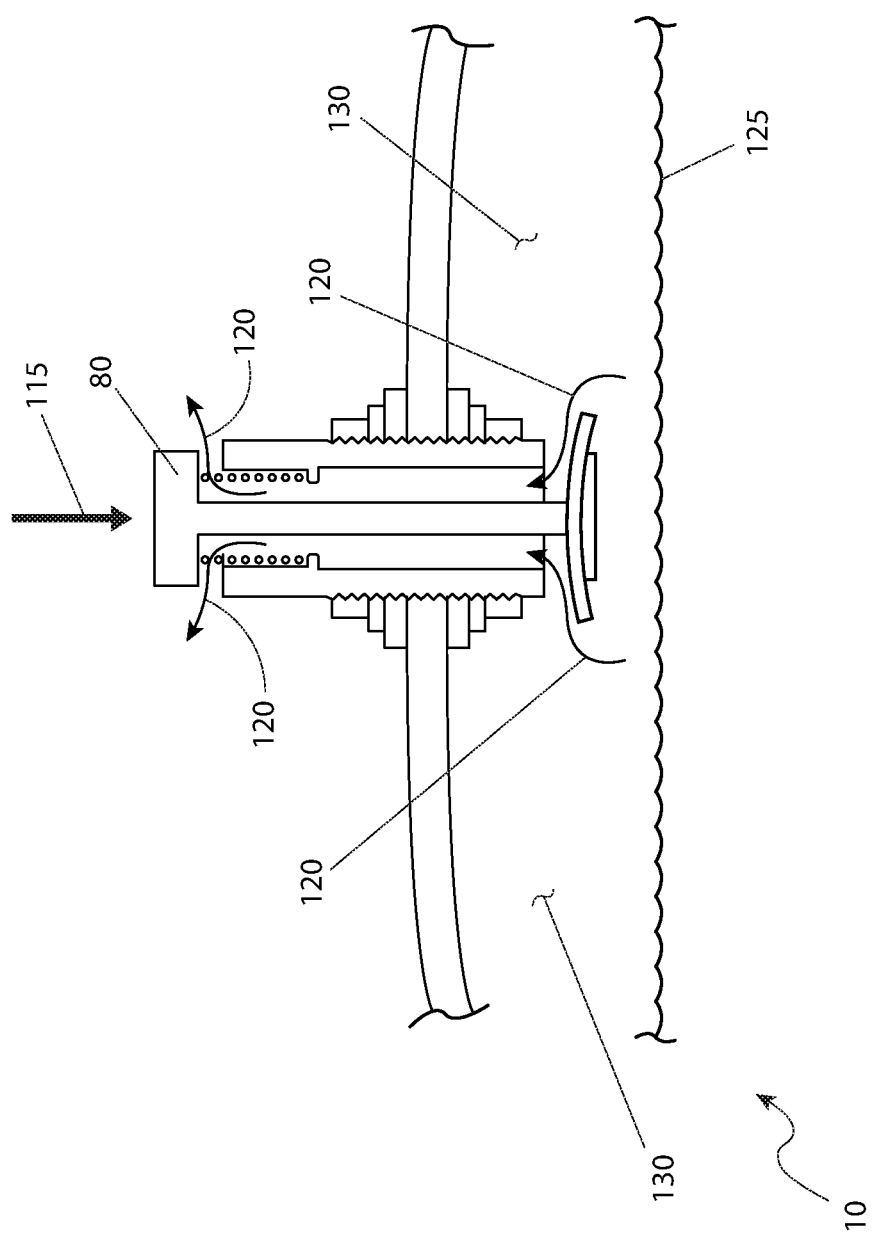
FIG. 3 is a sectional view of the manual air relief valve 10, as seen along a line I-I, as shown in FIG. 1, in a long-term open state, according to the preferred embodiment of the present invention; and, FIG. 4 is a sectional view of the manual air relief valve 10, as seen along a line I-I, as shown in FIG. 1, in a closed state, according to the preferred embodiment of the present invention.

Referring now to FIG. 3, a sectional view of the device 10, as seen along a line I-I, as shown in FIG. 1, in a long-term open state, according to the preferred embodiment of the present invention is shown. This depiction, similar to that of FIG. 2, discloses a rising water level 125 that is displacing unwanted air 130 along the air/water travel path 120. This activation requires continued downward pressure 115 upon the actuation button 80 by the user. Unwanted air 130 exits immediately below the actuation button 80 as shown as the rising water level 125 continues to rise upward. At the point at which water begins to exit from below the actuation button 80, the downward pressure 115 is removed.

Figure 4:
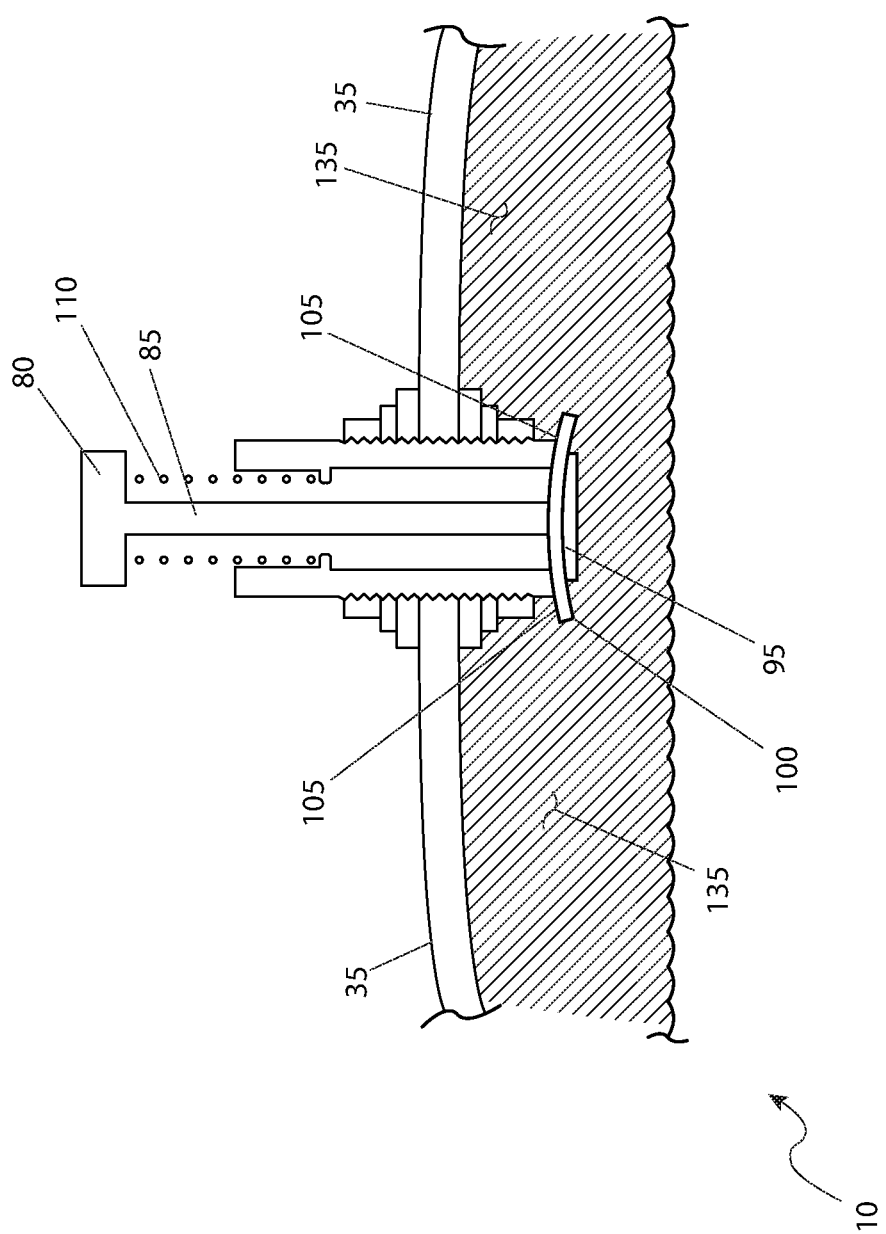

Referring to FIG. 4, a sectional view of the device 10, as seen along a line I-I, as shown in FIG. 1, in a closed state, according to the preferred embodiment of the present invention is disclosed. Such is the state described at the final point of FIG. 3 above. There is no longer any unwanted air 130 (as shown in FIG. 3) and water 135 occupies all space on the underside of the removable lid 35. With the downward pressure 115 (as shown in FIG. 2 and FIG. 3) removed, the circular opening 110 pushes the actuation button 80 and subsequently the center shaft 85 upward thus sealing the valve disc 95 and valve gasket 100 against the valve seat 105 and preventing any further exiting of water 135. This position described by FIG. 4 is the normal operating position.

3. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 4. The user would procure the device 10 through normal purchasing channels, either as part of a new pool pump 15 or as an aftermarket add-on kit for installation on an existing pool pump 15. Particular attention would be paid to price point, material of construction, overall size, operating pressures, and other technical parameters that are consequential during any valve specification and purchase.

After procurement and prior to utilization, the device 10, in aftermarket kit format would be installed in the following manner: the removable lid 35 removed from the pool pump 15, an appropriate hole drilled in the center of the removable lid 35, the device 10 would be placed as depicted in FIGS. 2-4; the device 10 is then fastened into position using the lower gasket 45, the lower washer 50, and the lower nut 55 on the lower side of the motor 25 and the upper gasket 65, the upper washer 70, and the upper nut 75 on the upper side of the removable lid 35; the lower nut 55 and upper nut 75 would then be hand tightened and secured with a wrench; and finally the removable lid 35 with the device 10 is then reinstalled on the pool pump 15.

During utilization of the device 10, the following procedure would be initiated: should air be trapped in the pump housing 20 or the strainer assembly 30, the user would press the actuation button 80 downward along the lines of the downward pressure 115; unwanted air 130 is then released via the device 10; downward pressure 115 is held until water begins to exit the device 10; the actuation button 80 is then released sealing the device 10 via the valve disc 95 against the valve seat 105. As such, the device 10 ensures proper operation of pump and balance of filtration system, lowers overall cost of filtration system usage, reduces wear and tear on equipment, and saves energy costs.

After use of the manual air relief valve for pool pumps 10, it is simply left in the resting state as depicted in FIG. 4, where it remains ready for additional future operations, should unwanted air 130 be present under the removable lid 35 at a future time. Such operation continues in a cyclical manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A manual air relief valve, comprising:
a pool pump including a pump housing attached to a motor;
a strainer assembly provided having a removable lid upon which said manual air relief valve is mounted;
a fixed body fastened in place on an underside of said removable lid by a lower gasket, a lower washer, and a lower nut against a threaded outer surface of said fixed body, in conjunction therewith, an upper gasket, an upper washer, and an upper nut seal said manual air relief valve on said outer surface of said removable lid; and
an actuation button connected to a center shaft which runs through a hollow opening through said fixed body, a lower end of said center shaft is provided with a valve disc complete with a valve gasket, said valve disc and said valve gasket operate against a valve seat provided as part of said fixed body.

2. The manual air relief valve according to claim 1, wherein said manual air relief valve for said pool pump is mounted in an upper portion of said pump housing directly without said strainer assembly.

3. The manual air relief valve according to claim 1, wherein said manual air relief valve is installed by drilling a suitable size hole in said removable lid, thus allowing installation by a final user in a do-it-yourself process.

4. The manual air relief valve according to claim 1, wherein said actuation button and said center shaft operates against towards a circular an opening.

5. The manual air relief valve according to claim 1, wherein said actuation button is in an activated position and held in a first open state by downward pressure, a first air/water travel path is provided to allow unwanted air to escape from said pump housing.

6. The manual air relief valve according to claim 1, wherein said manual air relief valve is standard equipment provided by a first manufacturer.

7. The manual air relief valve according to claim 1, wherein said manual air relief valve is optional equipment provided by a second manufacturer.

8. The manual air relief valve according to claim 1, wherein said manual air relief valve is installed by a final purchaser as an after-market add-on kit.

9. The manual air relief valve according to claim 1, wherein said manual air relief valve in a long-term open state includes a rising water level that is displacing unwanted air along an air/water travel path.

10. The manual air relief valve according to claim 9, wherein said long-term open state requires continued downward pressure upon said actuation button and unwanted air exits immediately below said actuation button as said rising water level continues to rise upward.

11. The manual air relief valve according to claim 10, further comprising at which water begins to exit from below said actuation button, said downward pressure is removed.

12. The manual air relief valve according to claim 1, wherein said manual air relief valve in a closed state includes there is no longer any unwanted air and water occupies all space on an underside of said removable lid.

13. The manual air relief valve according to claim 1 further comprising sealing said valve disc and said valve gasket against said valve seat and preventing any further exiting of water.

14. The manual air relief valve according to claim 13, wherein said manual air relief valve in a closed state is a normal operating position.

\* \* \* \* \*